United States Patent
Monereau et al.

(10) Patent No.: US 8,226,744 B2
(45) Date of Patent: Jul. 24, 2012

(54) REPRESSURIZATION OF A VSA TREATING A GAS MIXTURE COMPRISING A FUEL

(75) Inventors: Christian Monereau, Paris (FR); Natacha Haik-Beraud, Champigny-sur-Marne (FR); Vincent Gueret, Paris (FR); Anne Berthelemot, Paris (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 458 days.

(21) Appl. No.: 12/581,256

(22) Filed: Oct. 19, 2009

(65) Prior Publication Data

US 2010/0098491 A1 Apr. 22, 2010

(30) Foreign Application Priority Data

Oct. 21, 2008 (FR) ...................................... 08 57133

(51) Int. Cl.
*B01D 53/02* (2006.01)
(52) U.S. Cl. ......... 95/96; 95/21; 95/97; 95/101; 95/102; 405/53
(58) Field of Classification Search ................ 95/21, 96, 95/97, 101, 102; 405/53
See application file for complete search history.

(56) References Cited

U.S. PATENT DOCUMENTS

| | | | | |
|---|---|---|---|---|
| 3,306,841 A | * | 2/1967 | Ward .............................. 208/108 |
| 4,077,779 A | | 3/1978 | Sircar et al. | |
| 4,840,647 A | | 6/1989 | Hay | |
| 5,163,978 A | * | 11/1992 | Leavitt et al. ........................ 95/8 |
| 5,207,806 A | * | 5/1993 | Lagree et al. ........................ 95/8 |
| 5,656,067 A | * | 8/1997 | Watson et al. ................... 95/101 |
| 5,656,068 A | * | 8/1997 | Smolarek et al. ................ 95/101 |
| 5,702,504 A | * | 12/1997 | Schaub et al. .................... 95/101 |
| 5,755,856 A | * | 5/1998 | Miyake et al. ................... 95/101 |
| 5,792,239 A | * | 8/1998 | Reinhold et al. ................ 95/101 |
| 5,985,003 A | * | 11/1999 | Hayashi et al. .................. 95/101 |
| 6,245,127 B1 | * | 6/2001 | Kane et al. ....................... 95/101 |
| 6,287,366 B1 | | 9/2001 | Derive et al. | |
| 6,315,818 B1 | | 11/2001 | Monereau | |
| 6,451,097 B1 | * | 9/2002 | Andreani et al. ............... 96/380 |
| 6,517,609 B1 | | 2/2003 | Monereau et al. | |
| 2007/0261551 A1 | | 11/2007 | Sawada et al. | |
| 2008/0006151 A1 | * | 1/2008 | Baksh et al. ....................... 95/96 |

FOREIGN PATENT DOCUMENTS

| | | |
|---|---|---|
| EP | 1004343 | 5/2000 |
| EP | 1023934 | 8/2000 |
| EP | 1095689 | 5/2001 |

OTHER PUBLICATIONS

Ruthven, Douglas, M. et al., "Pressure Swing Adsorption", VCH Publishers, Inc., New York, NY 10010-4606, ISBN 1-56081-517-5, 1994.
Ruthven et al., "Pressure Swing Adsorption" VCH Publishers, Inc., New York, NY 10010, 1994.

\* cited by examiner

*Primary Examiner* — Robert J Hill, Jr.
*Assistant Examiner* — Christopher P Jones
(74) *Attorney, Agent, or Firm* — Elwood L. Haynes

(57) ABSTRACT

A method for purifying or separating a gas mixture comprising at least one fuel, using a unit having at least one adsorber subjected to a pressure cycle comprising at least one step of placing under vacuum by means of a vacuum pump, wherein at least one adsorber and/or the vacuum pump, depressurized during the cycle, is repressurized at least partly by an external gas to said unit and not containing a sufficient quantity of oxidizer to create an inflammable mixture during this repressurization.

20 Claims, 2 Drawing Sheets

REPRESSURIZATION OF A VSA TREATING A GAS MIXTURE COMPRISING A FUEL

This application claims priority to French Patent Application FR 0857133 filed Oct. 21, 2008, incorporated herein in its entirety.

BACKGROUND

The invention relates to the improvement of the safety of methods for separating or purifying a gas mixture, by adsorption and comprising a vacuum regeneration. It generally relates to VSA or VPSA in which the feed comprises at least one component capable of yielding a combustible mixture with air, such as hydrogen, carbon monoxide, hydrocarbons, etc.

The invention relates in particular to methods for separating $CO_2$.

SUMMARY

The increase in the mean temperature observed since the beginning of the industrial era is distinguished by its rapidity. Its potential impacts, from the rise in sea level to desertification, while not all known and quantified, are the focus of a growing global awareness. While it cannot be proved with certainty that climate change is caused by anthropic emissions of greenhouse gases, the correlations are sufficiently strong to encourage the application of the precautionary principle. Since $CO_2$ emissions contribute to about half of the warming potential, it is obviously important to investigate all possible means to reduce these emissions. The first approach is logically to seek to reduce the production of $CO_2$ by decreasing energy consumption. $CO_2$ capture at emission is a second supplementary approach insofar as the $CO_2$ storage is definitive. It should be observed that more than 50% of all $CO_2$ emissions are caused by electric power generation and industry. These are intense sources yet relatively few in number, and therefore eligible for a capture process. More precisely, the targets selected are thermal power plants burning coal or heavy fuel oil, gasification thermal power plants, and plants producing basic materials: steel (blast furnace gas, etc.), various metals, basic chemicals (by-product of $NH_3$ production, etc.), cement (lime kiln gas, etc.).

The generation of hydrogen or synthesis gas from carbon-rich sources can also generate flows containing an appreciable quantity of $CO_2$ (steam reforming of hydrocarbons, etc.). As sources containing $CO_2$, mention can also be made of biogases or gases issuing from waste, and certain natural gases.

At least part of the $CO_2$ capture can be used in industry, either directly, or after a post-treatment in design for example to improve its purity (food grade $CO_2$ for example) or to allow its storage (liquefaction, etc.).

The absorption of $CO_2$ in amines is a proven and effective technique. However, the energy penalty associated with amine desorption is an important factor that makes this technique unattractive today. Adsorption is a very good candidate because of the high retention selectivities between $CO_2$ on the one hand and the other gases present ($H_2$, $N_2$, CO, $CH_4$, etc.) on the other. Among adsorption processes, TSA (temperature swing adsorption) processes have the same drawback as absorption processes, that is, the adsorbent regeneration requires a high energy input in the form of a temperature increase. By contrast, the PSA process does not require any external energy inputs—in the form of heat or external substance (steam, etc.)—but uses gas expansion to regenerate the adsorbent.

The main question is accordingly to design a PSA process adapted to the objective of $CO_2$ capture.

To develop an economically acceptable capture process, the PSA unit in question must be optimized, according to the source to be captured, by the judicious choice of the following:

operating cycle of the unit (pressure cycle);
adsorbent or adsorbents and their arrangements;
adsorber technology;
integration of said unit in the industrial complex.

The prior art relative to PSA cycles and suitable for use for $CO_2$ capture is extensively developed in the literature. In fact, PSA (pressure swing adsorption) units, which have a regeneration pressure higher than atmospheric pressure, VSA (vacuum swing adsorption) units, which have an adsorption close to atmospheric pressure, generally between 1 and 2 bar abs and a vacuum regeneration, and VPSA (vacuum pressure swing adsorption) units, which have an adsorption at medium pressure, generally between 2 and 10 bar abs and a vacuum regeneration, have already been extensively investigated for various types of separation: production of high purity hydrogen, oxygen and/or nitrogen from air, methane from a $CH_4$/$CO_2$ mixture, CO from synthesis gas, etc.

In the rest of the discussion, the term VSA is used for any cycle comprising a vacuum regeneration phase.

Adsorption processes such as PSA and VSA are based on well known elementary steps: adsorption, balancing, purge providing, blow-down, purge and/or placing under vacuum for VSA, repressurization, and rinse.

These steps are described in various works on adsorption such as, for example, "Pressure Swing Adsorption" by Ruthven, Farooq and Knaebel. These steps may be sequenced or some of them may be simultaneous.

For example, document EP 1 004 343 describes a cycle for PSA H2 with two regeneration pressure levels with 4 adsorbers and one balancing.

Document EP 1 095 689 discloses a cycle with two adsorbers developed for the production of oxygen from air, a cycle comprising a repressurization with the unadsorbed gas, a balancing, a final repressurization with the feed gas, a production step, a blow-down step partly using a vacuum pump, and a purge phase.

Document U.S. Pat. No. 4,840,647 discloses a cycle with 2 adsorbers which is particularly suitable for capturing a readily adsorbable component such as $CO_2$.

Document EP 1 023 934 describes a PSA H2 type cycle with recycle of part of the low pressure offgas to the gas to be processed.

Document U.S. Pat. No. 6,287,366 discloses a VSA O2 cycle illustrating the combined steps such as simultaneous blow-down on both sides of the adsorber and repressurization with two different fluids.

Most of the cycles described are oriented toward the production of the least adsorbable gas or gases, with the more adsorbable gases constituting the offgas. This type of cycle may nevertheless be used for $CO_2$ capture. In this case, the PSA must, for example, be adapted to the $CO_2$ content in the light gases.

Document US 2007/0261551 relative to $CH_4$/$CO_2$ separation gives the example of a PSA H2 type cycle with a high pressure adsorption phase, two balancings, a co-current blow-down with purge providing, a final blow-down, a low pressure purge step with the gas previously recovered and the gas produced, and a final repressurization with the feed gas and the product gas.

This type of cycle may optionally be improved with the addition of steps more specific to the production of the most adsorbable gas, that is the $CO_2$ here. These additional steps are essentially recycling steps of a portion of the gas issuing from the blow-down in the feed gas or directly in another adsorber. A purge step can also be introduced with an external gas, such as nitrogen for example.

Document U.S. Pat. No. 4,077,779 describes a cycle with 4 or 6 adsorbers comprising the recycling of a part of the blow-down gas to another adsorber, and also a purge step with an external gas to the PSA. This document stipulates that the cycle can be used both for the production of hydrogen and for methane/$CO_2$ separation.

The prior art also describes cycles for extracting CO from a synthesis gas. In this case, the CO is the most readily adsorbable gas on a specific adsorbent. This type of cycle is directly transposable to the retention of the $CO_2$ contained in the essentially least adsorbable gases after replacement of adsorbents.

In short, the PSA cycles already developed for various applications can be used as such or with a few changes such as, in particular, recyclings of a portion of the gases produced in the blow-down steps either to the feed, or to another adsorber.

Adsorption processes are even more effective when the regeneration takes place at low pressure. This is especially true when the adsorbent strongly adsorbs a component. This is the case with the $CO_2$ insofar as zeolites A or X are used, for example. Under these conditions, the VSA generally have a better yield than the PSA. This advantage for VSA may be further accentuated when the feed gas is available at low or medium pressure. The use of vacuum for regeneration can then allow the treatment of the feed gas directly at its availability pressure without having to pressurize it first.

The invention described below relates exclusively to units comprising at least one vacuum step, that is during which the adsorbent is subject to a pressure lower than the local atmospheric pressure.

It is conventional in case of shutdown of such a unit to isolate the VSA from the rest of the installation. In the context of the present invention, shutdown means either a deliberate shutdown scheduled in advance—for example for maintenance of a part of the plant—or an emergency shutdown following an incident on the VSA itself or any other part of the plant. This generally takes place by shutting the valves of the adsorbers. More precisely, the VSA unit can be isolated from the upstream and downstream circuits by shutting the process valves which serve to carry out the cycle—for example by shutting each feed, production, offgas valve—or by closing specific shutoff valves located on the feed, production, offgas circuits. According to each specific case, it is possible—or not—to leave valves between adsorbers open, for example the pressure balancing valves or a repressurization valve. In any case, the upstream and downstream circuits are isolated, that is from the rest of the plant, one or more volumes comprising the adsorber or adsorbers and the gas volumes corresponding to the manifolds and piping up to the valves creating the isolation. In the context of the present invention, internal gas means the gas volume contained in this closed system and external gas means any gas outside this system.

On the assumption of a loss of tightness to the exterior, it is important to prevent air from entering an adsorber under vacuum which also contains CO and hydrogen. In fact, even if on the whole the average composition of the gases contained in the adsorber may not incur a hazard, the local situation is generally different. For example, there may be hydrogen-rich gas mixtures on the production side (decarbonated gas outlet) since most of the $CO_2$ will have been stopped previously. The combustible character of the adsorbent, for example in the case of active charcoal, can then aggravate the situation.

To eliminate this risk, it is customary to mutually balance the adsorbers of a VSA isolated from the rest of the installation as discussed above. This can be done, for example, by the valve serving to balance the adsorbers mutually. In this case, immediately after—or simultaneously with—the isolation of the VSA, all the balancing valves of the unit are opened.

In general, the pressure balancing between the adsorbers serves to reach an average pressure higher than atmospheric pressure. This may be different when treating a gas containing $CO_2$ in a VSA. It happens that the $CO_2$ is strongly adsorbed even at low pressure, and that its isotherm is sharply curved. By balancing 2 adsorbers having an identical volume, one under low pressure LP, and the other at higher pressure HP, a pressure balancing closer to the low pressure is obtained. A balancing between adsorbers therefore does not always serve to bring them below atmospheric pressure. In the case of pure VSA, that is with an adsorption just above atmospheric pressure, there is also a high risk that the adsorption unit may be under negative pressure after isolation. It may be observed in particular that the shutdown of the unit in case of incident can occur at anytime in the cycle: this is known as tripping. During a scheduled shutdown, on the contrary, it is possible to shut down the unit in a more favorable position, for example to await the end of a repressurization step. The case of tripping normally gives rise to situations in which the VSA unit is fairly systematically under negative pressure. In case of a loss of tightness on a flange or a valve, for example, air therefore enters the system and there is a risk of obtaining an inflammable atmosphere at least locally.

A similar risk exists with regard to the vacuum pump, in particular toward the end of pumping when the pressures in the machine are minimal. Its isolation in case of tripping off the unit leads to an average pressure lower than atmospheric pressure.

In fact, the vacuum pumps used on VSA comprise one, two or three pumping stages, essentially in series. The initial suction pressure is generally approximately the atmospheric pressure and this pressure falls during the cycle to the cycle low pressure. The discharge pressure of the vacuum pump is generally close to atmospheric pressure. In the case of a multistage pump, the intermediate pressures will vary during the cycle.

For example, it is possible to have a suction of a first stage at 0.1 bar abs, its discharge and the suction of the second stage about 0.25 bar abs, the discharge of the second stage and the suction of the third at about 0.6 bar abs, and finally, the discharge of the third stage at atmospheric pressure. Since the first stage is a larger machine than that of the second and even more so than that of the third, in case of tripping and isolation of the vacuum pump, the average pressure will settle at about 0.3 bar abs.

Such a vacuum pump comprises many valves and flanges and is therefore subject to entries of atmospheric air.

Accordingly, a problem that arises is to provide a purification of separation process that does not incur the risk of obtaining an inflammable atmosphere locally.

DESCRIPTION OF PREFERRED EMBODIMENT

Figure 1:
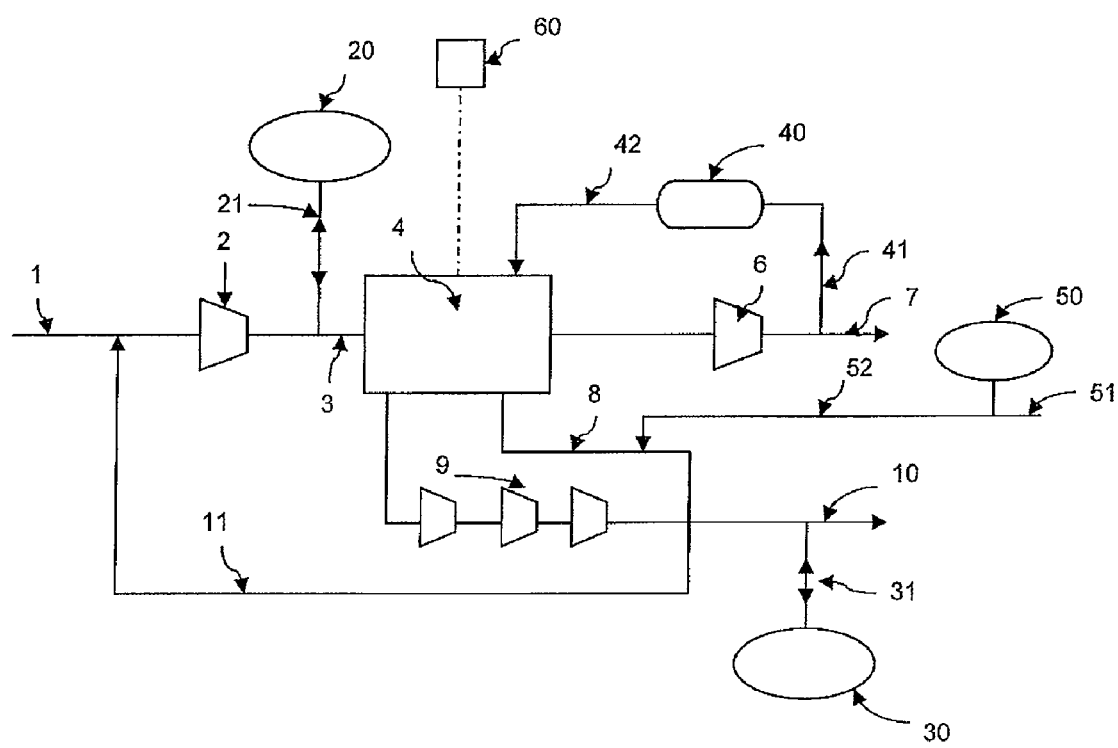
FIG. 1 illustrates one embodiment of the present invention, describing a system designed to remove most of the $CO_2$ from a gas mixture comprising, for example 40 mole % of $CO_2$, 40 mole % of CO, 10% of $N_2$ and 10% of $H_2$.

One solution of the invention is a method for purifying or separating a gas mixture 1 comprising at least one fuel, using a unit having at least one adsorber 4 subjected to a pressure cycle comprising at least one step of placing under vacuum by means of a vacuum pump 9, characterized in that at least the vacuum pump 9, depressurized during the cycle, is repressurized at least partly by an external gas to said unit and not containing a sufficient quantity of oxidizer to create an inflammable mixture during this repressurization.

It can be stated subsequently that the "vacuum pump" is depressurized when one part of the system constituting the vacuum pump is at a pressure lower than atmospheric pressure. This part is in particular the inlet (suction) of the vacuum pump.

Depending on each case, the method of the invention may have one or more of the following features:

the vacuum pump 9, depressurized during the cycle, is repressurized to a pressure equal to or higher than atmospheric pressure;

said repressurization, at least partly by an external gas to said unit and not containing a sufficient quantity of oxidizer to create an inflammable mixture, is carried out in case of shutdown of the unit;

said repressurization, at least partly by an external gas to said unit and not containing a sufficient quantity of oxidizer to create an inflammable mixture is carried out, during the operation of the unit, at each pressure cycle of at least one adsorber;

the repressurization, of the depressurized vacuum pump, by said external gas, takes place in less than 30 seconds, preferably in less than 10 seconds, even more preferably in less than 5 seconds;

at least one adsorber 4, depressurized during the cycle, is repressurized at least partly by said external gas;

the fuel is selected from hydrogen $H_2$, carbon monoxide CO, methane $CH_4$ and hydrocarbons;

the external gas is selected from the stored gas mixture 20, a gas issuing from a blow-down step, of said pressure cycle, and stored 30, the stripped and stored gas 40, and nitrogen issuing from a pressurized tank 50 or a unit for separating the gases of the air 51 or a mixture of these gases;

the gas mixture comprises carbon dioxide ($CO_2$), carbon monoxide (CO), nitrogen ($N_2$) and hydrogen ($H_2$), and in that the external gas is gas enriched with $CO_2$ issuing from a blow-down step of said pressure cycle;

said system is a VSA $CO_2$;

at least one adsorber 11 of the VSA is repressurized, after the shutdown of the unit, at least to atmospheric pressure, using a first volume 30a of said gas, external to said unit and not containing a sufficient quantity of oxidizer to create an inflammable mixture during this repressurization; said volume 30a being stored in a gas holder 30 placed at the vacuum pump 9 discharge;

the vacuum pump 9 is repressurized, after the shutdown of the unit and/or at the end of each step of placing under vacuum, to atmospheric pressure using a second volume 30b of said gas, external to said unit and not containing a sufficient quantity of oxidizer to create an inflammable mixture during this repressurization; said volume 30b being stored in a gas holder placed at the vacuum pump discharge;

during the operation of the unit, the gas holder 30 contains a security volume equal to the first volume of gas 30a;

the vacuum pump 9 is repressurized in less than 5 seconds, preferably in less than one second;

the repressurization of the vacuum pump 9 and preferably of at least one adsorber 11 from the security volume is triggered manually or automatically at each risk of air entry;

the $CO_2$ issuing from the VSA is packed in cylinders or fed to a $CO_2$ line for industrial use or underground storage directly or after supplementary treatment, preferably after a cryogenic treatment.

In the context of the present invention, "vacuum pump" means any system serving to lower the pressure in the adsorber. It may be a centrifugal pump, a rotary piston positive displacement pump, a blower, or an ejector. It may consist of several pumping stages in series or in parallel.

The external gas used to repressurize a depressurized element of the system is preferably selected from the stored gas mixture 20, a gas issuing from the blow-down step, compressed and stored 30, nitrogen issuing from a pressurized tank 50 or from an air gas separation unit 51.

Contrary to the prior art which does not comprise this additional means, this would serve to repressurize the system rapidly.

In fact, it is generally not possible to repressurize the unit rapidly by tapping gas directly from the gas feed circuit, from the purified gas circuit or from the $CO_2$ enriched gas circuit. This is because the volume of gas contained in the piping is small in comparison with the quantity of gas required, so that proceeding in this way would lead to the placing of a portion of these circuits under vacuum, and thereby increasing the risks of the entry of air.

One solution of the invention therefore consists in associating with the system a storage unit of available gas to repressurize at least part of the system (adsorbers, vacuum pump) and not containing a sufficient quantity of oxidizer to create an inflammable mixture during the repressurization step.

The invention will be described in greater detail in conjunction with FIGS. 1 and 2.

FIG. 1 describes a system designed to remove most of the $CO_2$ from a gas mixture comprising, for example 40 mole % of $CO_2$, 40 mole % of CO, 10% of $N_2$ and 10% of $H_2$.

The feed gas 1 available at a pressure close to atmospheric pressure, is pressurized by a few hundred millibars via a compressor 2 and fed 3 to an adsorber of the VSA unit 4. The decarbonated gas 5, that is practically containing a few tenths of ppm to less than 5% of $CO_2$ depending on the applications, is compressed via a compressor 6 and fed 7 to the downstream unit. The pressurized offgas is first extracted via the manifold 8 and then via the vacuum pump 9. A fraction of this offgas is recycled to the feed 11 while the other fraction is extracted 10 to be utilized or sequestered.

The gas stored to repressurize at least one adsorber and/or the depressurized vacuum pump may be:

feed gas stored using storage means 20 and associated transfer means 21, gas enriched with $CO_2$ issuing from the final blow-down or pumping stored using storage means 30 and associated transfer means 31, gas partially stripped of $CO_2$, stored using storage means 40 and transfer means 41 and 42, and/or nitrogen.

In the latter case, the nitrogen may issue from a storage unit 50 near the system, or directly from an air gas separation unit 51. This may be the offgas available in large quantity at low pressure.

Said gas storage units may be of the gas holder type, that is, the gas is stored at atmospheric pressure (in practice under slight overpressure of a few millibar to a few tens of millibar according to the gas holder technology). When the gases are available under pressure, simple storage vessels can be used.

In FIG. 1, it has been assumed that the storage units 20, 30, 50 are of the gas holder type while the purified gas storage unit is of the vessel type.

The system is equipped with a monitoring and control system 60. When an important parameter (pressure, temperature, flow rate, composition, position of a valve, etc.) exits its normal range of value, the unit goes into safe mode by shutting down automatically. If a risk of air entry into the system has been detected, for example the presence of oxygen in the stream issuing from the vacuum pump or abnormal pressure, etc., the safety system causes the injection of inert gas into the unit from one of the gas storage means 20, 30, 40 and/or 50 and transfer means 21, 31, 42, 52 provided for this purpose. This injection may also be triggered systematically upon each shutdown of the unit. This decision can be taken during the design of the plant, particularly after a risk analysis.

In the context of the present invention, 'inert gas" not containing a sufficient quantity of oxidizer to create an inflammable mixture during the repressurization step.

This repressurization of the unit to atmospheric pressure automatically eliminates any possibility of the entry of air, thereby eliminating any risk of creating an inflammable mixture.

The possibility of rapidly injecting an inert gas at the vacuum pump also serves in a number of cases to decrease the energy consumption. It will then be advantageous to systematically use this possibility during the normal cycles of the VSA. This will now be explained with a VPSA $CO_2$ cycle with 4 adsorbers as shown in FIG. 2.

The gas to be treated 1 is compressed to 4 bar abs upstream of the VPSA via a compressor 2.

The compressed gas to be treated is then introduced into an adsorber 11 in order to retain the $CO_2$. The product gas is sent via the manifold 17 to a production tank 200 with the twofold purpose of storage (to allow the sending of a constant flow rate to the user 221) and mixing (in order to have production with a substantially constant content during the cycle). When the $CO_2$ content—average or instantaneous—reaches a predefined threshold (for example 0.5 to 5% on average in the vessel depending on the operating conditions), the adsorber is isolated and its regeneration cycle begins. The next phase consists in performing two successive blow-downs, the first in co-current and the second in counter-current: the gas issuing from the first sub-steps serves to repressurize an adsorber already regenerated (balancing via the manifold 18) during which the second sub-step, which consists of a depressurization to atmospheric pressure, supplies a portion of the $CO_2$-rich gas 15. The $3^{rd}$ phase corresponds to the vacuum pumping step via the vacuum pump 9 connected to the VPSA by the line 16. The minimum pressure depends on the performance required of the VPSA. It may vary from 0.30 to 0.05 bar abs according to the operating conditions. The final target pressure can be obtained by adjusting the pumping rate—if the pump is equipped with a speed variator—but more generally by adjusting the pumping time. The pumping takes place via three stages of blowers (rotary piston positive displacement pump) installed in series. As conventionally performed on VSA O2, the cycle may comprise a downtime so that the pumping phase has the same duration as the other phases constituting the cycle, even if the actual pumping stage has a shorter duration. The gas extracted by the vacuum pump constitutes the fraction 16bis. This fluid can be mixed with the fluid 15 to constitute the $CO_2$ production and be sent to the downstream network 23. The fourth phase is a repressurization phase, first by means of a balancing step (cf. phase 2), and then by the decarbonated product gas.

The VPSA cycle can therefore be represented as follows:

| | | |
|---|---|---|
| $1^{st}$ phase | Adsorption $CO_2$ | Adsorption $CO_2$ + repressurization |
| $2^{nd}$ phase | Balancing 1 | Blow-down to atmospheric P |
| $3^{rd}$ phase | Vacuum pumping | Vacuum pumping |
| $4^{th}$ phase | Balancing 1 | Repressurization |

More precisely, the $3^{rd}$ pumping phase may comprise one or two additional downtimes at the start and/or end of the step and may therefore be represented as follows:

| | | | | |
|---|---|---|---|---|
| $3^{rd}$ phase | Downtime (TM1) | Vacuum pumping | Vacuum pumping | Downtime (TM2) |

The initial downtime (TM1) essentially serves for reduced operation, that is for adjusting the duration of the $3^{rd}$ phase. The second downtime serves to adjust the pumping time to the desired low pressure. As for most of the PSA type units, it is conventional to adjust the phase time to the treated flow rate. For example, if 50% of the nominal flow rate is treated, the absorption time is 2 minutes instead of 1 minute. The actual pumping time will remain approximately constant, for instance, 55 seconds plus or minus 5 seconds. In this case, to carry out operation reduced to 50%, a first downtime TM1 of 55 seconds is adopted for example, and the second downtime TM2, which, as described, serves to adjust the cycle low pressure, will vary between 5 and 15 seconds.

To limit the energy consumption during the downtimes, it is customary to "repressurize" the vacuum pump so that the blowers (rotary piston positive displacement pumps) just cause the gas to circulate without compression work. The energy then only serves to overcome the friction and pressure drops. This repressurization must take place very rapidly to allow an appreciable gain considering the short duration of the downtimes. It is not recommended to repressurize with air as can be done on VSA O2 for safety considerations (presence of combustible gas) and the vacuum pump or the adsorber, in case of a defect in a valve (air entry while the valve of the adsorber under vacuum is not fully shut). It is therefore also advantageous for this reason to be able to eject a gas containing no oxygen very rapidly to the suction of the vacuum pump. Furthermore, the suction of the pump must not be placed under overpressure in comparison with its discharge, since the pump can then run in overspeed and risk being very seriously damaged.

Figure 2:
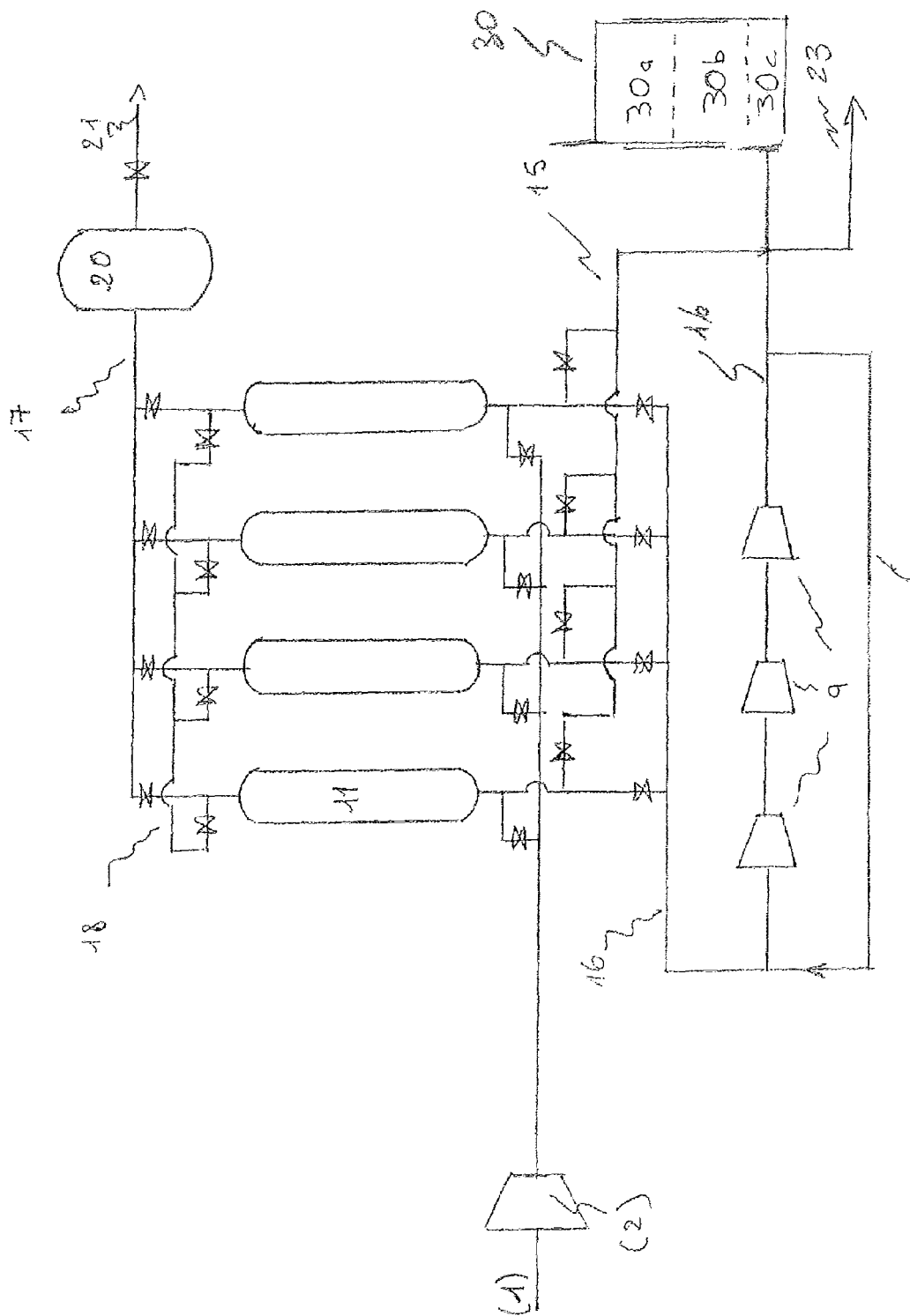
FIG. 2 illustrates another embodiment of the present invention, describing a VPSA $CO_2$ cycle with 4 adsorbers.

In the case of the VSA $CO_2$ previously described, the preferable solution consists in installing a gas holder 30 at the vacuum pump discharge as shown in FIG. 2. This gas holder serves to store a volume of gas 30a at a pressure slightly higher than atmospheric pressure (a few tens of millibar above), making it possible if necessary to repressurize the VSA at least to atmospheric pressure as described in the previous example. The gas free of oxygen and more generally of oxidizer can be introduced into the unit via the circuit 15 which normally serves for blow-down. The gas holder also contains the volume of gas 30b serving at each cycle to raise the pressure of the vacuum pump 22 to atmospheric pressure, in order to save energy as explained above. This repressurization can be carried out via the discharge circuit 16 of the vacuum pump and its by-pass 24. The gas holder may also comprise a gas storage volume 30c, which is variable through the cycle, to permit the extraction of an essentially constant flow rate therefrom. In fact, the inlet flow rate is generally variable during the operating cycle of the PSA. Since the vacuum pump is generally of the positive displacement type, the flow rate is high at the start of pumping and decreases as the suction pressure decreases.

The regulation of the gas holder is such that the security volume 30a is preserved permanently to be available in case of need. This regulation may, for example, be reflected by the existence of a low level L1 and a very low level L2. In normal operation, the gas holder regulates between a high level H1 and the low level L1. The volume of gas between L1 and L2 is preserved permanently in the gas holder for security. The repressurization circuits mentioned above are preferably dimensioned to repressurize the VSA rapidly as required and the vacuum pump at each cycle. This repressurization preferably takes place in a few seconds, even in less than one second, at the suction of the vacuum pump. The advantage of using a gas holder as a storage means is that the equipment can never be repressurized above about atmospheric pressure. Hence there is no risk, for example, of placing the suction of the vacuum pump under overpressure. The installation of a gas holder is the privileged solution, but it may sometimes be difficult to implement (large volume, extreme climatic conditions, etc.). It is possible to store the volume of gas required for the repressurizations (security and/or to save the energy required for the vacuum pump) in a pressurized storage unit. The design of this storage unit and/or the regulation of the repressurization must then be examined carefully to avoid potential problems of over-repressurization (running the vacuum pump in overspeed for example). Hybrid solutions are obviously feasible. In most cases, a gas issuing from the PSA can be used to repressurize the unit rapidly without the risk of forming combustible or even explosive mixtures. An external gas, such as nitrogen, can nevertheless be used. This may be inerting nitrogen at a few bar pressure or, if necessary, nitrogen offgas from a neighboring air gas separation unit.

The repressurization of the VSA using security gas can be triggered manually, for example using an emergency push-button, or automatically. It may be systematic upon each tripping of the unit or, on the contrary, may be triggered by specific sensors which indicate a risk of air entry (monitoring of variations in pressure, continuous offgas analysis with oxygen detection, etc.).

What is claimed is:

1. A method for purifying or separating a gas mixture comprising at least one fuel, using a unit having at least one adsorber subjected to a pressure cycle comprising at least one step of placing under vacuum by means of a vacuum pump, wherein at least the vacuum pump, depressurized during the cycle, is repressurized at least partly by an external gas to said unit and not containing a sufficient quantity of oxidizer to create an inflammable mixture during this repressurization.

2. The method of claim 1, wherein the vacuum pump, depressurized during the cycle, is repressurized to a pressure equal to or higher than atmospheric pressure.

3. The method of claim 1, wherein said repressurization, at least partly by an external gas to said unit and not containing a sufficient quantity of oxidizer to create an inflammable mixture, is carried out during shutdown of the unit.

4. The method of claim 1, wherein said repressurization, at least partly by an external gas to said unit and not containing a sufficient quantity of oxidizer to create an inflammable mixture, is carried out, during the operation of the unit, at each pressure cycle of at least one adsorber.

5. The method of claim 1, wherein the repressurization, of the depressurized vacuum pump, by said external gas, takes place in less than 30 seconds.

6. The method of claim 5, wherein the repressurization, of the depressurized vacuum pump, by said external gas takes place in less than 10 seconds.

7. The method of claim 5, wherein the repressurization, of the depressurized vacuum pump, by said external gas takes place in less than 5 seconds.

8. The method of claim 1, wherein at least one adsorber, depressurized during the cycle, is repressurized at least partly by said external gas.

9. The method of claim 1, wherein the fuel is selected from the group consisting of hydrogen $H_2$, carbon monoxide CO, methane $CH_4$ and hydrocarbons.

10. The method of claim 1, wherein the external gas is selected from the group consisting of the stored gas mixture, a gas issuing from a blow-down step, of said pressure cycle, and stored, the stripped and stored gas, and nitrogen issuing from a pressurized tank and a unit for separating the gases of the air or a mixture of these gases.

11. The method of claim 1, wherein the gas mixture comprises carbon dioxide, carbon monoxide, nitrogen and hydrogen, and wherein the external gas is gas enriched with $CO_2$ issuing from a blow-down step of said pressure cycle.

12. The method of claim 1, wherein said unit is a VSA $CO_2$ unit.

13. The method of claim 12, wherein at least one adsorber of the VSA is repressurized, after a shutdown of the unit, at least to atmospheric pressure, using a first volume of said gas, external to said unit and not containing a sufficient quantity of oxidizer, to create an inflammable mixture during this repressurization; said volume being stored in a gas holder placed at the vacuum pump discharge.

14. The method of claim 13, wherein the vacuum pump is repressurized, after a shutdown of the unit and/or at the end of each step of placing under vacuum, to atmospheric pressure using a second volume of said gas, external to said unit and not containing a sufficient quantity of oxidizer to create an inflammable mixture during this repressurization, said volume being stored in a gas holder placed at the vacuum pump discharge.

15. The method of claim 13, wherein during the operation of the unit, the gas holder contains a security volume equal to the first volume of gas.

16. The method as claimed in claim 15, wherein the repressurization of the vacuum pump and at least one adsorber from the security volume is triggered manually or automatically at each risk of air entry.

17. The method of claim 13, wherein the vacuum pump is repressurized in less than 5 seconds.

18. The method of claim 17, wherein the vacuum pump is repressurized in less than one second.

19. The method of claim 12, wherein the $CO_2$ issuing from the VSA is packed in cylinders or fed to a $CO_2$ line for industrial use or underground storage directly or after supplementary treatment.

20. The method of claim 19, wherein the $CO_2$ issuing from the VSA is packed in cylinders or fed to a $CO_2$ line for industrial use or underground storage directly or after supplementary treatment, after a cryogenic treatment.

* * * * *